United States Patent Office 3,422,086
Patented Jan. 14, 1969

3,422,086
RUTIN ALKYL SULPHONATES
Maurice Claude Ernest Carron, Levallois-Perret, and Alexandra F. Jullien, born Jandot, Paris, France, assignors to Societe Anonyme des Laboratoires Robert et Caniere, Paris, France, a corporation of France
No Drawing. Filed Aug. 9, 1965, Ser. No. 478,472
Claims priority, application France, Aug. 12, 1964, 984,996; Oct. 26, 1964, 992,657
U.S. Cl. 260—210        3 Claims
Int. Cl. A61k 25/00; C08b 25/00

ABSTRACT OF THE DISCLOSURE

Monosulfopropyl ether of rutin is prepared by reacting the sodium salt of rutin with propane sultone in equimolecular proportions in an inert polar solvent, preferably dimethylformamide, at a temperature of from 70–80° C. The purified product, rutin sodium O-monopropyl-sulfonate, is insoluble in alcohol and ether, but is soluble in dimethylformamide and somewhat soluble (10% w./v.) in water, has similar pharmacological properties as rutin.

This invention relates to rutin derivatives.
Rutin is a natural product, the formula of which is as follows:

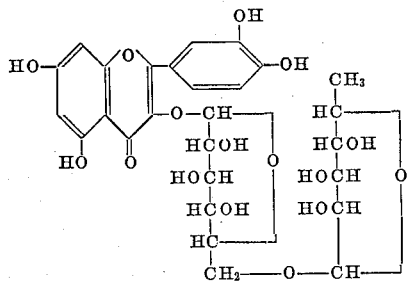

It is thus a glucoside containing four phenol functions in its molecule. It is practically insoluble in water.

The present invention provides new rutin derivatives which are water-soluble and give aqueous solutions which can be used for the same purposes as the known solutions containing rutin solubilised in other ways.

The new rutin derivatives have the formula:

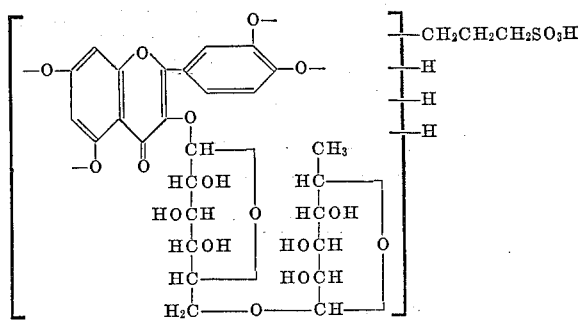

and they may be used as the free sulphonic acid or as a salt thereof with a base, more especially a base containing a non-toxic cation. Thus the alkali metal (sodium and potassium) and calcium salts are preferred.

The new rutin derivatives are made, in accordance with a feature of the invention, by reacting rutin with propane sultone in equimolecular proportions. This reaction is preferably carried out using a mono-alkali metal salt of rutin, generally the mono-sodium salt, at an elevated temperature in an inert polar solvent such as dimethylformamide. The reaction can also be carried out in other media, e.g. water or ethanol, though a lower yield is obtained. When a base is present, the product obtained is a salt of that base.

The following example illustrates the invention.

EXAMPLE

To 6.465 g. of rutin dihydrate (0.01 mol), dissolved with heating in 100 ml. of ethanol, a solution of 0.23 g. (0.01 gm. atom) of sodium in 25 ml. of absolute ethanol is gradually added. The sodium salt of the rutin precipitates. Alcohol is removed by evaporating the whole to dryness under reduced pressure and the residue is taken up in 100 ml. of dimethylformamide. To the solution obtained, 1.22 g. (0.01 mol) of propane sultone dissolved in a few ml. of dimethylformamide are added, and the mixture is heated on a water bath to 70–80° C. for two hours. The dimethylformamide is then evaporated in vacuo on the water bath, and the residue is extracted twice with ethanol at boiling point to remove unreacted rutin and propane sultone. The insoluble product is filtered off hot, and dried in vacuo over phosphorus pentoxide and then in an oven at 50° C. 5.5 g. (70% yield) of rutin sodium O-monopropyl sulphonate are thus obtained.

This sodium salt is insoluble in alcohol and ether. It is soluble in water to approximately 10% and in dimethylformamide. The pH value of the aqueous solution is about 7. Analysis of the sulphur content gave the following result: theoretical=4.25%; found=4.22%.

By acidification of the aqueous solution, for example with hydrochloric acid, there is no immediate precipitate but, after standing for at least 24 hours, a gelatinous precipitate of the free sulphonic acid is formed.

The pharmacological effects of the described sodium salt are as follows:

(I) Action on capillary permeability

The action of rutin sodium O-monopropyl sulphonate on the capillary permeability was investigated by the method of Ambrose and Eds (J. Pharmacol, Exp. Therap., 90, No. 4, pages 359–63, August 1947) carried out on the rabbit. Male or female albino rabbits with an average weight of 2.5 kg. were used. The abdomen of the animals was shaved and the following day the rabbits were injected intravenously with 2 ml. of a 1% aqueous solution of Trypan blue. Five minutes after this injection, a cotton wool pad soaked in chloroform and having a diameter of about 4 mm. was applied at 3 or 4 points to the shaved zone and the time taken for the blue colour to appear was observed. The compound under test was then immediately injected intravenously in a dose of 200 mg./kg. (as a 10% solution in physiological serum) and, 5 minutes later, the irritant agent was applied at other points on the abdomen. Once again the time taken for the blue colour to appear was observed.

The following points are to be noted in connection with the test.

(1) As the response of the skin was not the same, depending on the height on the abdomen, the control points and the points after treatment with the test compound were varied systematically from one rabbit to another.

(2) The time taken was always that required for the blue colour to appear, not that for its complete development.

(3) In this method, each rabbit is its own control.

The average time for the blue colour to appear after application of chloroform was 8 minutes for the control experiment, and 22 minutes for the experiments after treatment with the new rutin derivative.

This latter compound thus appreciably retards the appearance of the blue colour caused by the injection of Trypan blue, after local irritation of the skin, causing an increase in the permeability of the vascular zones. This test thus shows that the new compound decreases capillary permeability.

(II) Acute toxicity (1) *Intraperitoneally.*—The tests were carried out on male mice, weighing on average 20 g. each, by the usual methods. The rutin sodium O-monopropyl sulphonate was injected intraperitoneally in aqueous solution at a concentration of 200 mg./ml. The mortality over a period of 48 hours was observed. Up to a dose of 5 g./kg., all the animals survived. With a dose of 7 g./kg., the mortality rate was 30% of the mice. It was not possible to calculate the $LD_{50}$ because it was not possible either further to increase the concentration of the solution or to inject the animals with larger volumes than those used for lower doses.

(2) *Orally.*—The tests were carried out under similar conditions. At doses of 10 and 15 g./kg., the mortality of the mice was 50%. It has not been possible to calculate the exact $LD_{50}$ because here again it was not possible to administer larger quantities of substance to the animals.

(III) Chronic toxicity

Chronic toxicity tests of the new salt have been carried out in 15 male and 15 female rats, weighing an average of 140 g. each. The test was carried out in conventional manner. The animals received orally 100 mg./kg. of the salt every day except Sundays for three months. The growth curves of the control animals and those receiving the sodium salt were similar. No alteration in blood pattern was observed. Macroscopic and histological examination of the viscera showed no anomalies.

These results show that the new rutin derivative can be considered as practically non-toxic.

The new rutin derivative can be used therapeutically, more especially for decreasing capillary fragility. It is preferably used as one of its salts, especially on alkali metal salt or calcium salt.

The invention accordingly includes within its scope pharmaceutical compositions comprising a new rutin derivative in accordance with this invention in association with a compatible pharmaceutical carrier. Such compositions may be in a form suitable for oral or parenteral administration and may comprise conventional diluents and excipients compatible with the active compound. They may be made up in conventional manner.

Typical examples of therapeutic compositions in accordance with the invention are as follows:

(1) *Injectable solutions.*—Injectable solutions are prepared in ampoules containing 100 mg. of active substance dissolved in 5 ml. of physiological serum or water.

Because of the good solubility of the new compound, it is also possible to prepare solutions containing a larger quantity of active substance (250 mg., for example) in 5 ml. or a smaller quantity of liquid vehicle (100 mg. of active substance in 2 ml. of water, for example). These solutions can be administered intramuscularly or intravenously.

(2) *Tablets or dragees.*—Tablets containing the following products perfectly mixed and passed through a 100-mesh screen are prepared by double compression.

| | Kg. |
|---|---|
| Rutin sodium O-propyl sulphonate | 10 |
| Starch | 3 |
| Talcum | 4.7 |
| Silica gel | 2 |
| Magnesium stearate | 0.3 |

The tablets each contain a dosage of 100 mg. of active substance. They may be coated, using the usual technique for the manufacture of dragees, using a gummy or gelatinous syrup, a powdered mixture of calcium carbonate and talc, and, finally, ordinary syrup to complete the smoothing of the coating.

The invention accordingly includes within its scope a method for the reduction of capillary fragility which comprises administering to a subject from 0.5 to 5 mg. per kilogram per day of one or more of the new rutin derivatives of this invention. The new derivatives are conveniently administered orally or intraperitoneally in the form of the pharmaceutical compositions described above.

We claim:
1. A rutin derivative of formula:

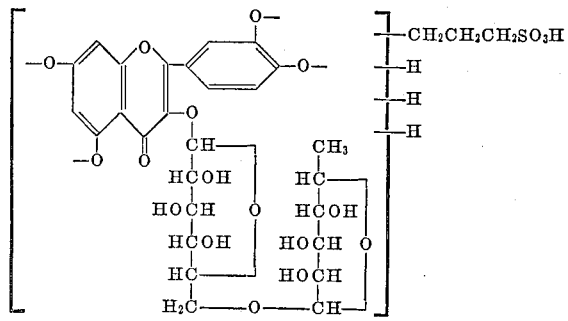

and its alkali and alkaline earth metal salts.

2. Process for the preparation of a water-soluble derivative of rutin which comprises reacting rutin with propane sultone in equimolecular proportions, at a temperature of 70–80° C. and in an inert polar solvent.

3. Process according to claim 2 in which the monosodium salt of rutin is reacted with propane sultone in equimolecular proportions, at a temperature of 70–80° C. and in an inert polar solvent from the class consisting of dimethylformamide, water, and ethanol.

References Cited

UNITED STATES PATENTS

| 3,075,965 | 1/1963 | Touey et al. | 260—210 |
| 3,352,754 | 11/1967 | Gazave | 167—81 |

FOREIGN PATENTS 570,143 2/1959 Canada.

LEWIS GOTTS, *Primary Examiner.*

J. R. BROWN, *Assistant Examiner.*

U.S. Cl. X.R.

424—180